July 2, 1940. P. J. RENNHACK 2,206,513
LIQUID HEATER
Filed Oct. 17, 1939

INVENTOR
P. J. RENNHACK
BY H. M. Knoth
ATT'Y.

Patented July 2, 1940

2,206,513

UNITED STATES PATENT OFFICE 2,206,513

LIQUID HEATER

Paul J. Rennhack, Chicago, Ill.

Application October 17, 1939, Serial No. 299,855

2 Claims. (Cl. 122—457)

This invention relates to a liquid heater of the vapor-dispensing type, and more particularly it relates to a steam generator or boiler.

The purposes for which the present invention proves useful are those wherein it is desirable to generate quickly and easily a required amount of vapor or steam for immediate use and wherein a continued supply of such vapor will be readily furnished. A particular use to which such generator or boiler may be put is that of furnishing steam to be utilized in removing wall paper or the like where soaking by steam is required.

The principal object of the present invention is to provide a vapor generator or boiler capable of boiling successive small quantities of liquid.

An important object is to provide a reservoir containing water or other liquid under pressure to insure a positive supply to the steam generating means.

Another important object is to provide for dispersing or spraying water into the steam generating means, whereby it will be more readily converted to vapor.

Another object is to provide means responsive to the water level in the steam generating means for controlling the admission of water thereto from the reservoir.

Another object is to provide an improved arrangement between the steam generating means and a heating element, whereby the water to be vaporized has immediate contact with a portion of the heating element that serves also as a wall of the generating tank.

And another object is to provide a tank structure of the portable type including a lower, smaller generating chamber and an upper, larger water reservoir, whereby the water in the reservoir may be to some extent preheated before being admitted to the generating chamber.

Briefly and specifically, these and other important objects and desirable features are attained in one preferred embodiment of the invention wherein there is provided a portable, unitary tank structure including a lower steam chamber and an upper water reservoir, the reservoir containing water under pressure and the chamber containing a smaller amount of water at a predetermined level. A conduit is provided between the reservoir and the chamber and includes a dispersing means in the form of a needle valve responsive to a lower water level in the chamber, which valve, when opened, disperses or sprays water into the chamber in close proximity to a heating element at the bottom of the chamber, whereby the water is more readily vaporized.

A more complete understanding of the novel features and arrangements provided by the invention may be had from the following detailed description taken in conjunction with the accompanying sheet of drawings wherein.

Figure 1:
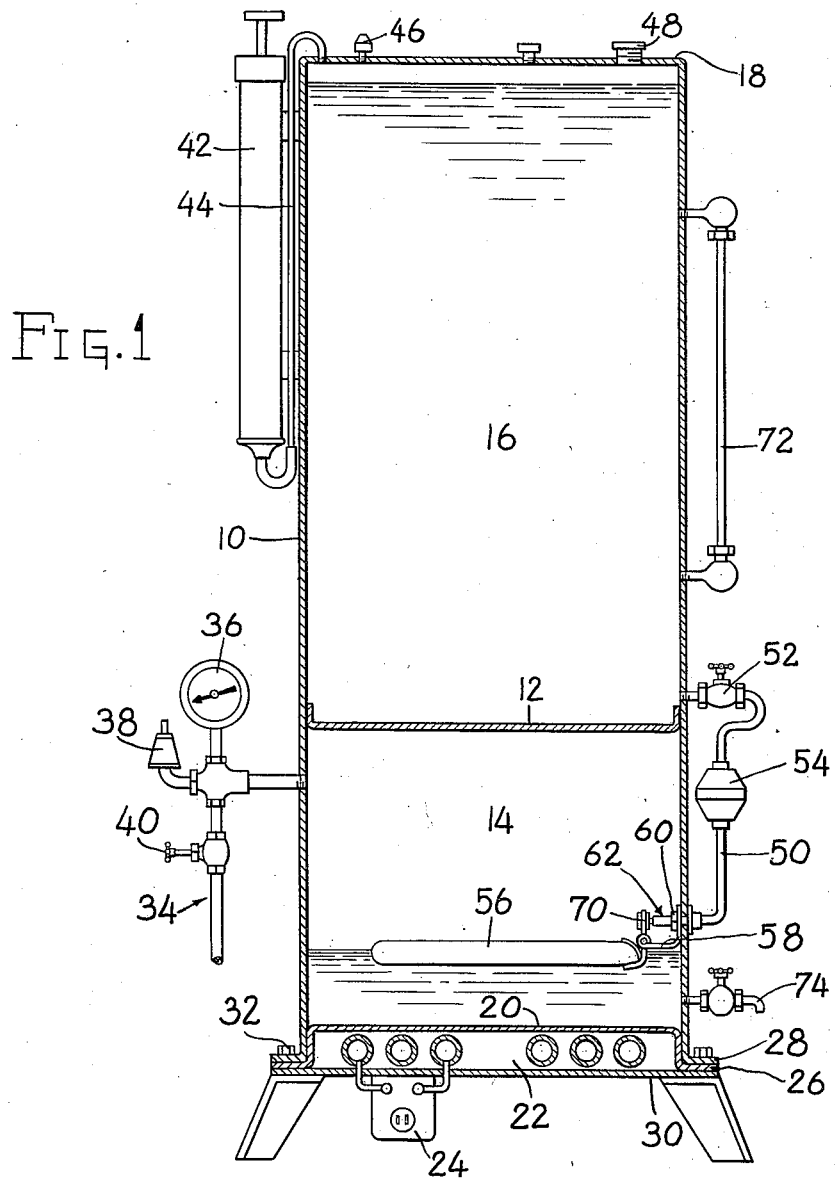
Figure 1 is a vertical sectional view of the tank structure.

The particular structure shown is a portable unit comprising a preferably cylindrical sheet metal tank structure 10 separated intermediate its upper and lower ends by a transverse wall 12 into a lower vapor or steam chamber or heating means 14 and an upper reservoir 16, the latter being sealed at its top by a top wall 18. The comparative sizes of the chamber and reservoir are preferably substantially those illustrated, for purposes which will hereinafter appear.

The bottom of the chamber 14 is closed by a bottom wall 20, comprising also the heating plate, preferably of copper, of a heating element 22. This element is preferably of the electric type and includes a convenient connector 24.

The bottom plate 20 is formed with a peripheral flange 26 cooperating between a peripheral flange 28 on the outer wall of the tank 10 and a secondary bottom plate 30, the three ports being removably, but securely, held together by bolts 32. The provision of the novel plate arrangement permits quicker vaporization of water contained in the chamber 14, since an immediate association is provided for between the plate or wall 20 and the water.

The secondary plate or wall 30 comprises part of a base including legs on which the tank unit is supported.

The chamber 14 is approximately one-third of the tank 10 and is adapted to contain a comparatively small amount of water at a predetermined level, as shown. The quantity of water being small and in immediate contact with the heating plate 20, steam is readily formed, and is dispensed through a steam outlet 34, including a gauge 36, safety valve 38 and shut-off 40. This outlet may be suitably connected to any desired means for utilizing the steam thus generated.

The upper reservoir 16 is about twice the size of the chamber 14, or two-thirds of the tank 10, and is adapted to contain an appreciably larger quantity of water in reserve.

As previously mentioned, the reservoir 16 is sealed by the top wall 18, and is adapted to be furnished with self-contained pressure by a pressure means in the form of a hand pump 42 carried by the tank and connected by an air line 44 with the reservoir. In this manner the water in the reservoir is placed under pressure independent of any external water-pressure lines. The top 18 is provided with a suitable air relief valve 46 and a removable filler cap 48.

The reservoir 16 and heating means or chamber 14 are connected by a feed line or conduit 50, provided at the reservoir end with a shut-off 52, intermediate its ends with a suitable strainer 54, and at its chamber end with a water-dispersing means, to be presently described.

The conduit 50 enters the chamber 14 at a point closely spaced above the bottom plate 20, generally in the plane of the chamber water level as indicated by a float 56, as positioned in Figure 1.

Figure 2:
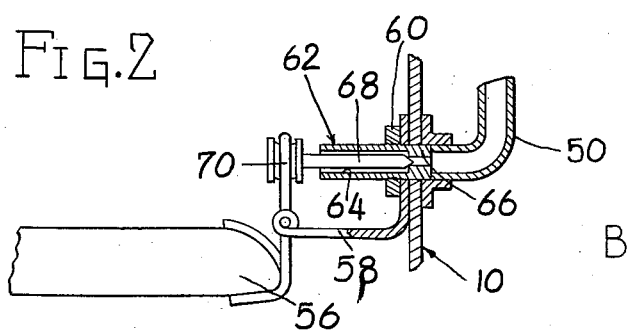
Figure 2 is an enlarged view of a preferred form of float-controlled liquid-dispersing arrangement.

The float is pivotally carried, as shown in Figure 2, at one side on a bracket 58 rigidly secured by a nut 60 threaded on a valve housing 62 carried by a side wall of the tank 10. The housing 62 contains a bore 64 which is reduced and provided with a valve seat 66 having a smaller bore communicating with the conduit. A needle valve 68 is carried in the bore of the housing 62 and is associated at its outer end with an arm and yoke arrangement 70, in turn carried and actuated by the float 56. The inner end of the needle valve seats on the valve seat 66. This valve arrangement provides the water dispersing means mentioned above, and is illustrated as a preferred embodiment of such means.

The reservoir is provided with a suitable water gauge 72. The chamber includes a drain cock 74.

In the operation and use of the generator the reservoir is filled and placed therein under pressure by the pump 42, whereat a certain amount of water will enter the chamber 14 until the float 56 rises to the predetermined level to close the needle valve 68.

The heating element is turned on and the chamber water vaporized. The needle valve is comparatively sensitive, and the slightest downward movement of the float will permit a diffusion or dispersion of water under pressure from the reservoir into the chamber, the water being projected or dispersed generally in a spray forming a plane substantially parallel to and closely spaced above the heating element 22. This manner of admitting the water results from the combination of the valve arrangement, 66, 68; the pressure on the reserve water; and the disposition of the chamber end of the conduit 50. The comparative sizes of the chamber and reservoir, as previously mentioned, permits a certain amount of preheating of the reservoir water, thus enabling steam to be still more readily generated.

From the foregoing description it will be seen that an improved liquid-heating and vapor-dispensing apparatus has been provided. It will be understood, of course, that certain parts and arrangements, such as the relation of the chamber and reservoir, the water-dispersing valve, and others, may be modified or altered without departing from the spirit and scope of the invention as defined in the appended claims.

What is claimed is:

1. A liquid heater comprising a heating tank having walls and adapted to contain liquid at a predetermined level, a heating element associated with the tank and having a heating surface of an area substantially coextensive with a wall of the tank, a liquid reservoir, a conduit between the reservoir and tank and communicating with the tank at a point therein lying in a plane generally parallel to the heating element, and above the normal liquid level a nozzle valve in the conduit and means responsive to a low liquid level in the tank for controlling said valve to admit liquid from the reservoir through the valve to disperse and project the liquid generally in a zone including the aforesaid plane.

2. A liquid heater comprising a heating tank having a bottom wall and adapted to contain liquid at a predetermined level, a heating element arranged below said bottom wall, a sealed liquid reservoir, means for placing the liquid in the reservoir under pressure, a conduit between the reservoir and tank and communicating with the tank at a point spaced closely above the bottom wall, and above the normal liquid level, a dispersing valve in the conduit, and means responsive to a low liquid level in the tank for controlling the valve to admit liquid under pressure from the reservoir through the valve into the tank, said valve and pressure dispersing the admitted liquid generally through a zone closely spaced above the tank bottom wall.

PAUL J. RENNHACK.